April 4, 1939.  E. D. HOWE  2,153,250
FISHING REEL
Filed April 29, 1938  3 Sheets-Sheet 1
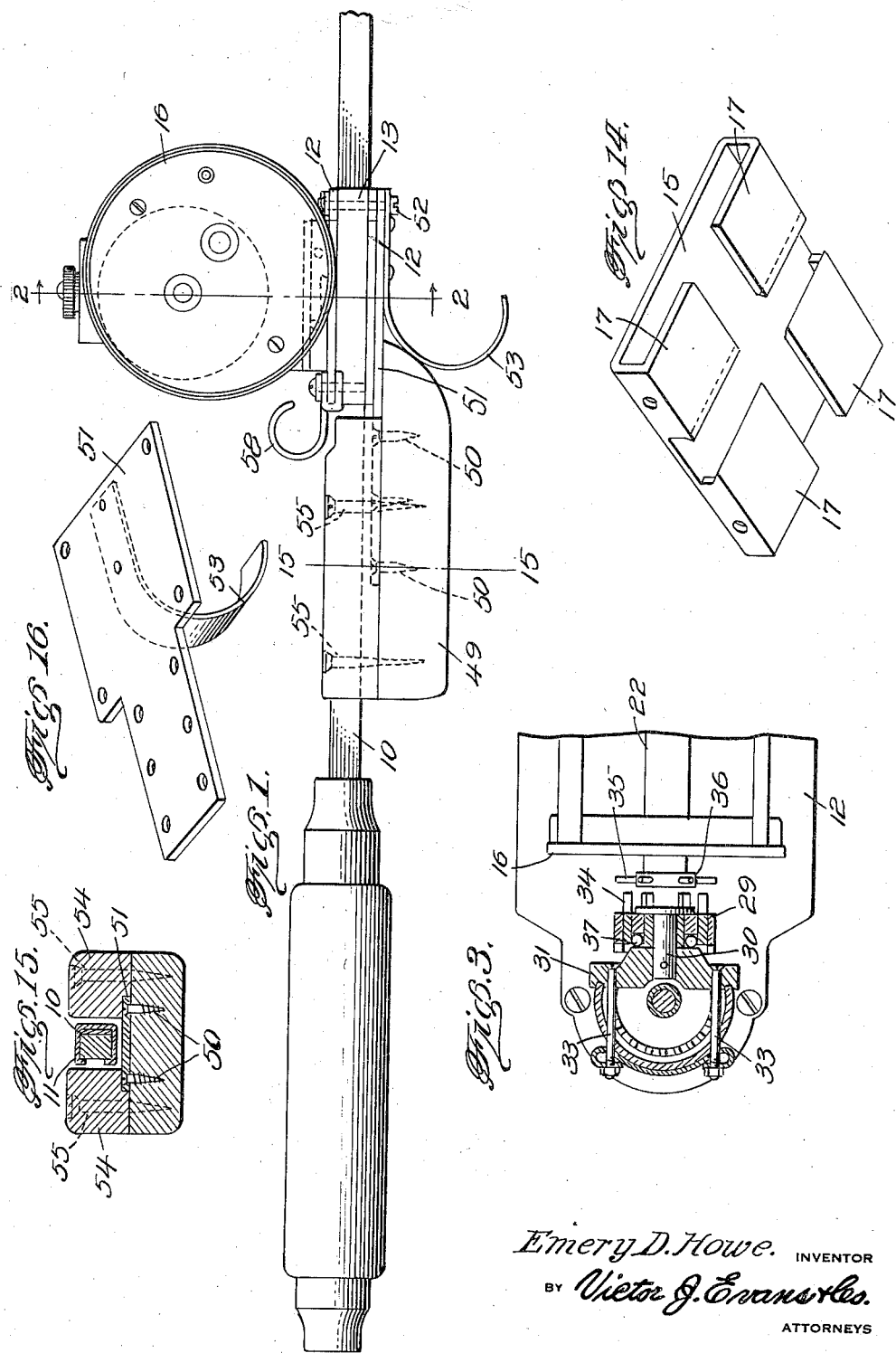
Emery D. Howe. INVENTOR
BY Victor J. Evans & Co.
ATTORNEYS April 4, 1939.  E. D. HOWE  2,153,250
FISHING REEL
Filed April 29, 1938   3 Sheets-Sheet 2
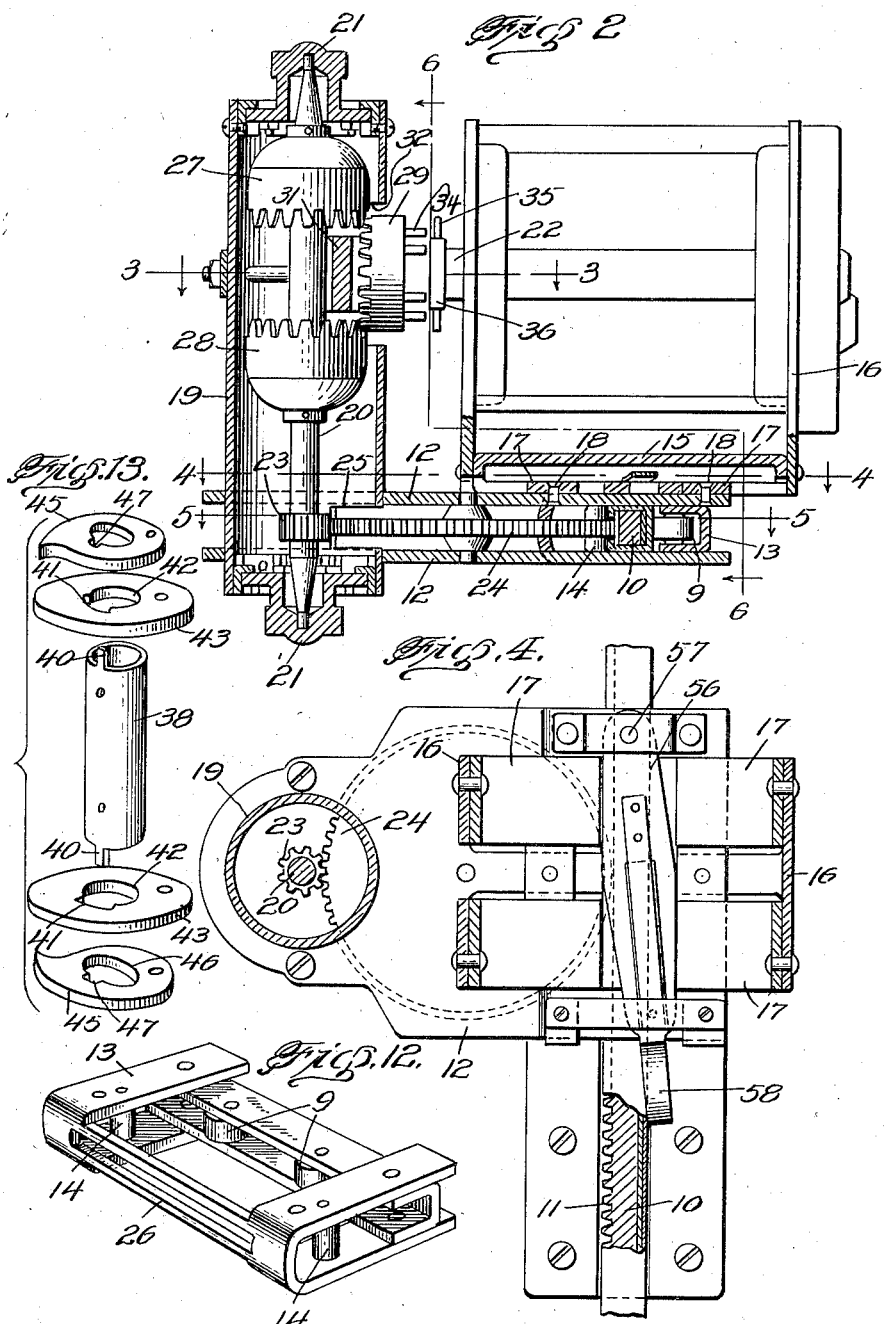
Emery D. Howe, INVENTOR
BY Victor J. Evans & Co.
ATTORNEYS

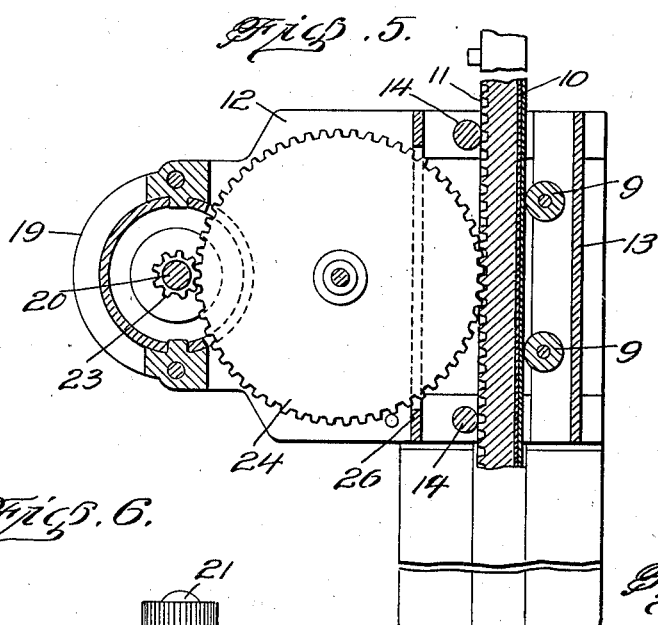
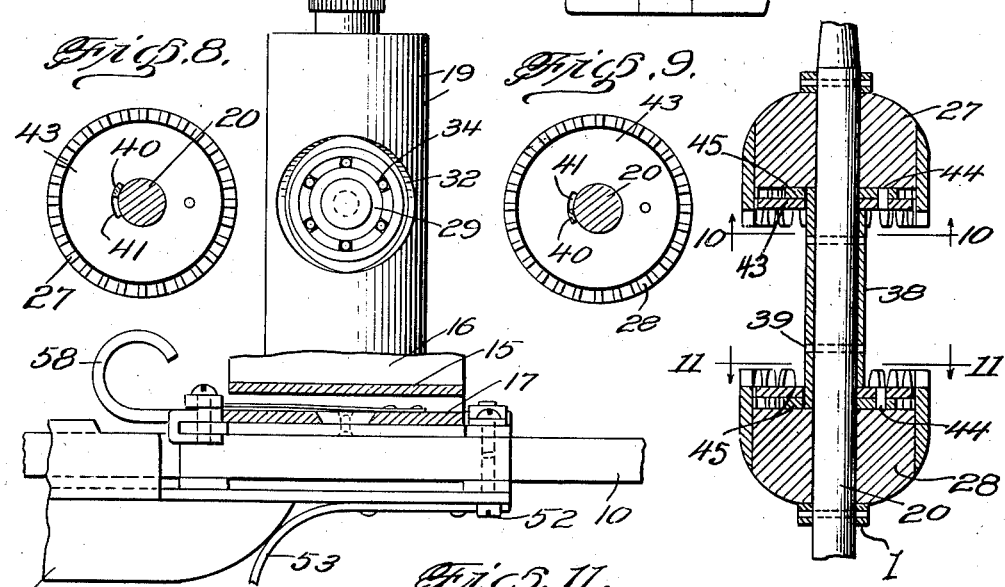
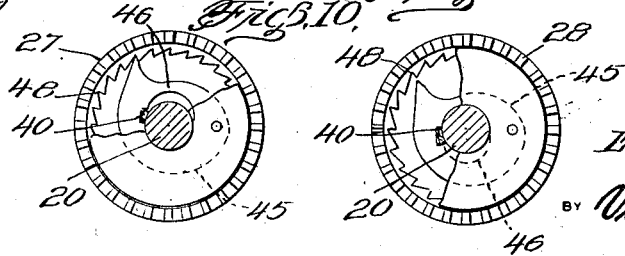

Patented Apr. 4, 1939

2,153,250

UNITED STATES PATENT OFFICE 2,153,250

FISHING REEL

Emery D. Howe, Coldwater, Mich.

Application April 29, 1938, Serial No. 205,085

5 Claims. (Cl. 43—20)

This invention relates to fishing reels and has for an object to provide mechanism for rotating the reel to wind up the fishing line as the reel is reciprocated manually of the fishing rod.

A further object is to provide novel reversing clutch mechanism which will be positively driven and will be devoid of springs or like small breakable parts.

A further object is to provide a combined frame and grip upon which the reversing clutch mechanism and the reel is mounted for reciprocatory movement as a unit longitudinally of the fishing rod, the frame housing gear mechanism for cooperating with a rack mechanism on the fishing rod to actuate the reel.

A further object is to provide a novel shift lever connected with the frame and with the reel for clutching and de-clutching the reel from the reel driving shaft of the mechanism.

A further object is to provide a reel and driving mechanism therefor which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to without the scope of the appended claims without departing from the spirit or sacrificing any of the advantages of the invention.

In the accompanying drawings forming part of this specification,

Figure 1 is a side elevation of a fishing rod equipped with a reel and actuating mechanism therefor, constructed in accordance with the invention.

Figure 2 is a cross sectional view of the reel actuating mechanism taken on the line 2—2 of Figure 1.

Figure 3 is a cross sectional view of the clutch mechanism taken on the line 3—3 of Figure 2.

Figure 4 is a cross sectional view taken on the line 4—4 of Figure 2 and showing the clutch controlling lever, the rack on the fishing rod and the gear driven by the rack to actuate the reel.

Figure 5 is a cross sectional view taken on the line 5—5 of Figure 2 showing the guide rollers for directing reciprocatory movement of the reel carrying frame and grip as a unit longitudinally of the fishing rod.

Figure 6 is a cross sectional view taken on the line 6—6 of Figure 2 and showing the housing of the reversing clutch and the clutch wheel for driving the reel.

Figure 7 is a longitudinal sectional view of the reversing clutch mechanism.

Figure 8 is a bottom plan view of the upper ratchet gear of the reversing clutch.

Figure 9 is a top plan view of the lower ratchet gear of the reversing clutch.

Figure 10 is a cross sectional view taken on the line 10—10 of Figure 7 with a portion broken away to expose the dog and ratchet teeth of the upper reversing clutch member.

Figure 11 is a cross sectional view taken on the line 11—11 of Figure 7, a portion being broken away to expose the dog and ratchet teeth of the lower reversing clutch member.

Figure 12 is a detail perspective view of the frame member which carries guide rollers.

Figure 13 is an exploded perspective view of the reversing clutch ratchet mechanism.

Figure 14 is a perspective view of the frame member to which the reel is secured.

Figure 15 is a cross sectional view taken on the line 15—15 of Figure 1 showing the construction of the grip.

Figure 16 is a detail perspective view of the finger grip and its attaching plate.

Referring now to the drawings in which like characters of reference designate similar parts in the various views, 10 designates a fishing rod which preferably is of rectangular cross section and has formed on one side thereof rack teeth 11. A pair of parallel frame plates 12 are slidably mounted on the fishing rod as best shown in Figure 2 and a guide frame 13, best shown in Figure 12, is interposed between the plates and secured to the plates in any preferred manner. The guide frame is provided with guide rollers 9 which bear against one edge of the fishing rod and is also provided with guide pins 14 which bear against the opposite edge of the fishing rod, as best shown in Figure 2.

A bracket 15, best shown in Figure 14, is fixed at the sides to the side plates of a fishing reel 16, as best shown in Figure 2. The bracket is provided with fingers 17 which are riveted to the top frame plate 12, as shown at 18 in Figure 2. The reel 16, bracket 15, guide frame 13, and frame plates 12 form a unit assembly which is adapted to be reciprocated longitudinally of the fishing rod.

The frame plates 12 project laterally beyond the toothed side of the fishing rod and to the outer ends of the plates a tubular housing 19 is secured in any preferred manner. A shaft 20 is journaled at the ends in bearings 21 which are mounted in the ends of the housing. The shaft extends perpendicular to the shaft 22 of the reel and carries reversing clutch mechanism for driving the shaft of the reel as will presently be described. The shaft 20 is provided with a pinion 23 which meshes with a gear 24 that is mounted between the frame plates 12 and projects into the housing 19 through a slot 25 formed therein. The gear 24 projects through a longitudinal slot 26 in the guide frame 13, best shown in Figure 12, and meshes with the rack teeth 11 of the fishing rod.

Mounted loose on the shaft 20 is an upper clutch member 27 and a lower clutch member 28 and these clutch members continuously mesh with diametrically opposite sides of a clutch gear 29 which is loosely mounted on a shaft 30, best shown in Figure 3. The shaft 30 is carried by a bar 31 which is disposed in a transverse opening 32 formed in the housing 19 and is secured to the housing by bolts 33. The shaft 30 is disposed in alignment with the shaft 22 of the reel 16 so that the teeth 34 on the gear 29 may mesh with pins 35 on a clutch wheel 36 carried by the shaft 22 of the reel when the reel is shifted bodily on the frame plates 12 toward the tubular housing 19, as will presently be described. Preferably, the clutch gear 29 is provided with ball bearings 37 to reduce friction.

As heretofore stated the clutch members 27 and 28 are loose on the shaft 20 and are held against movement longitudinally of the shaft by stop pins 1. The members are provided with respective ratchet mechanisms which automatically clutch one member to the shaft and simultaneously declutch the other member from the shaft so that the reel will be continuously driven in one direction to wind up the fishing line.

The ratchet mechanism is best shown in Figures 7 and 13. A shift sleeve 38 is rigidly secured to the shaft 20 by pins 39 or other connectors and is provided at the opposite ends with aligned fingers 40. These fingers enter arcuate slots 41 formed in the peripheries of axial openings 42 formed in discs 43 which are secured to the shells of the upper and lower clutch members 27 and 28 by pins 44 which are integral with the shells. Dogs 45 are pivoted on the pins 44 and have center openings 46 of slightly elliptical contour as shown in Figures 10 and 11 to permit the dogs rocking on the shaft 20. The dogs are provided with notches 47 which nicely receive the fingers 40 of the shift sleeve to shift the dogs alternately into engagement with ratchet teeth 48 formed on the inner surface of the shells of the upper and lower clutch members.

When the unit assembly of reel 16, bracket 15, guide frame 13, frame plates 12 and reversing clutch housing are moved as a unit in one direction longitudinally of the fishing rod, one of the fingers 40 will clutch its respective dog with the ratchet teeth of one of the clutch members while the other finger will simultaneously release its dog from the respective ratchet teeth on the other clutch member so that the reel will be driven continuously in one direction through the medium of the upper clutch member 27 being clutched to the shaft 20 when the latter is rotated in one direction and the lower clutch member 28 is clutched to the shaft when it is rotated in the opposite direction, and since these clutch members engage the clutch gear 29 at diametrically opposite points the latter will always be driven in the same direction by the clutch member which is in clutched position with the shaft 20.

By referring to Figure 1 it will be seen that a grip 49 is attached by screws 50 to a plate 51, best shown in Figures 15 and 16, which plate is secured by screws 52 to the bottom frame plate 12. A finger grip 53 is secured to the plate 51 and is disposed in front of the grip which latter may be grasped in the palm of the hand to reciprocate the device on the fishing rod. Cleats 54 are secured to the grip 49 by screws 55 and extend on opposite sides of the fishing rod 10.

For shifting the reel 16 bodily toward and away from the reversing clutch housing 19 a lever 56 is pivoted at one end as shown at 57 in Figure 4, upon the upper frame plate 12 and extends between the fingers 17 of the bracket 15. The rear end of the lever is provided with a finger grip 58 by means of which the lever may be shifted to engage one pair of the fingers 17 and move the reel and bracket 15 across the upper frame plate 12 toward the housing 19 to clutch the clutch members 29 and 36, or may be moved in the opposite direction to shift the reel outwardly and declutch said clutch member.

Since the operation has been described as the description of the parts progressed it is thought that the invention will be fully understood without further explanation.

What is claimed is:

1. The combination with a fish rod, of a toothed rack disposed lengthwise of the fish rod, a reel supporting frame movable lengthwise of the rack in reverse directions, a shaft on the frame geared to the rack to be driven in reverse directions by the rack, clutch gears loose on the shaft, a reel rotating gear disposed between the clutch gears and meshing at diametrically opposite points with both of said clutch gears, a dog and ratchet mechanism establishing driving connection between the driven shaft and one of the clutch gears, a dog and ratchet mechanism establishing driving connection between the driven shaft and the other clutch gear, and shift fingers fixed to the driven shaft and connected to respective dog and ratchet mechanisms for declutching one of the clutch gears from the shaft and clutching the other clutch gear to the shaft for driving the reel rotating gear continuously in one direction.

2. The combination with a fish rod, of a toothed rack disposed lengthwise of the fish rod, a reel supporting frame movable lengthwise of the rack in reverse directions, a shaft on the frame geared to the rack to be driven in reverse directions by the rack, clutch gears loose on the shaft, a reel rotating gear disposed between the clutch gears and meshing at diametrically opposite points with both of said clutch gears, discs loose on the driven shaft and fixed to the respective clutch gears, there being an arcuate slot in each disc, a dog pivoted to each disc and having an elliptical opening receiving the driven shaft to permit pivotal movement of the dog, ratchet teeth formed on each clutch member coacting with the respective dog, each dog having a slot in said opening aligning with the slot in the respective disc and being of less length than the slot in the disc, and shift fingers fixed to the driven shaft and engaged through the long slots in the discs and snugly fitting in the short slots in the dogs for shifting one of the dogs into engagement with the respective ratchet teeth and shifting the other dog out of engagement with the respective ratchet teeth for driving the reel rotating gear continuously in one direction.

3. The combination with a fish rod, of a toothed rack disposed lengthwise of the fish rod, a reel supporting frame movable lengthwise of the rack in reverse directions, a reel on the frame, a tubular housing on the frame extending perpendicular to the shaft of the reel, a shaft in the housing geared to the rack to be driven in reverse directions by the rack, clutch gears loose on the shaft, a reel rotating gear carried by the housing in axial alignment with the shaft of the reel, said reel rotating gear meshing at diametrically opposite points with both of said clutch gears, a dog and ratchet mechanism establishing driving connection between the driven shaft and one of the clutch gears, a dog and ratchet mechanism establishing driving connection between the driven shaft and the other clutch gear, and shift fingers carried by the driven shaft and connected to the respective dogs and ratchet mechanisms for declutching one of the clutch gears from the driven shaft and clutching the other clutch gear to the driven shaft for driving the reel rotating gear continuously in one direction.

4. The combination with a fish rod, of a toothed rack disposed lengthwise of the fish rod, a reel supporting frame movable lengthwise of the rack in reverse directions, a reel slidably mounted on the frame, a shaft on the frame geared to the rack to be driven in reverse directions by the rack, clutch gears loose on the shaft, a reel rotating gear disposed between the clutch gears and meshing at diametrically opposite points with both of said clutch gears, a lever pivoted on the frame and connected to the reel for shifting the reel into clutched position or declutched position with said reel rotating gear, a dog and ratchet mechanism establishing driving connection between the driven shaft and one of the clutch gears, a dog and ratchet mechanism establishing driving connection between the driven shaft and the other clutch gear, and shift fingers carried by the driven shaft connected to said dog and ratchet mechanisms for declutching one of the clutch gears from the driven shaft and clutching the other clutch gear to the driven shaft for driving the reel rotating gear continuously in one direction.

5. The combination with a fish rod, of a toothed rack disposed lengthwise of the fish rod, a reel supporting frame movable lengthwise of the rack in reverse directions and extending laterally in one direction from the fish rod, a tubular housing extending perpendicular to the laterally extending portion of the frame, a shaft journaled at its ends in the housing, a pinion fixed to the shaft, a gear carried by the frame and meshing with the pinion and with the rack for rotating the shaft in reverse directions, there being an opening in the housing between its ends, a cross plate secured to the tubular housing and extending through the opening, a reel rotating shaft rotatably supported by the cross plate, a reel rotating gear disposed on the shaft within the housing, clutch gears loose on the driven shaft and engaging the upper and lower sides of the reel rotating gear, a dog and ratchet mechanism establishing driving connection between the driven shaft and one of the clutch gears, a dog and ratchet mechanism establishing driving connection between the driven shaft and the other clutch gear, and means carried by the driven shaft and connected to both dog and ratchet mechanisms for alternately clutching one of the clutch gears and simultaneously declutching the other clutch gear from the shaft to drive the reel rotating gear continuously in one direction.

EMERY D. HOWE.